United States Patent
Barczak

(10) Patent No.: US 11,698,859 B2
(45) Date of Patent: Jul. 11, 2023

(54) DIRECT MAP MEMORY EXTENSION FOR STORAGE CLASS MEMORY

(71) Applicant: SK Hynix NAND Product Solutions Corp, Rancho Cordova, CA (US)

(72) Inventor: Mariusz Barczak, Gdansk (PL)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 593 days.

(21) Appl. No.: 16/728,457

(22) Filed: Dec. 27, 2019

(65) Prior Publication Data

US 2020/0142825 A1    May 7, 2020

(51) Int. Cl.
*G06F 12/00* (2006.01)
*G06F 12/02* (2006.01)

(52) U.S. Cl.
CPC .. *G06F 12/0284* (2013.01); *G06F 2212/1024* (2013.01); *G06F 2212/1041* (2013.01)

(58) Field of Classification Search
CPC ......... G06F 12/0284; G06F 2212/1024; G06F 2212/1041; G06F 3/064; G06F 3/0644; G06F 3/0679; G06F 3/061
See application file for complete search history.

(56) References Cited

U.S. PATENT DOCUMENTS

| | | | |
|---|---|---|---|
| 2014/0258670 A1* | 9/2014 | Venkatasubramanian | G06F 12/08 711/171 |
| 2015/0143037 A1* | 5/2015 | Smith | G06F 3/065 711/148 |
| 2015/0309940 A1* | 10/2015 | Kumar | G06F 12/1027 345/506 |
| 2017/0228012 A1* | 8/2017 | Shirota | G06F 1/329 |
| 2019/0258583 A1* | 8/2019 | Chittor | G06F 12/0246 |
| 2022/0350531 A1* | 11/2022 | Wang | G06F 3/064 |

OTHER PUBLICATIONS

Jennings, Seth, "The zswap compressed swap cache", Feb. 12, 2013, 9 pgs, <https://lwn.net/Articles/537422/>.

* cited by examiner

*Primary Examiner* — Shawn X Gu
*Assistant Examiner* — Mohammad S Hasan
(74) *Attorney, Agent, or Firm* — Haley Guiliano LLP

(57) ABSTRACT

An embodiment of an electronic apparatus may include one or more substrates, and logic coupled to the one or more substrates, the logic to receive a first request to allocate a direct swap file associated with an application stored in a system memory on a persistent storage media, and map a linear and continuous space of the persistent storage media to the direct swap file associated with the application in response to the first request. Other embodiments are disclosed and claimed.

20 Claims, 8 Drawing Sheets

DIRECT MAP MEMORY EXTENSION FOR STORAGE CLASS MEMORY

BACKGROUND

An important part of a computer system is RAM memory. The cost of such memory is significant, particularly for an entire server system. Some applications may require a high memory footprint, which increases the cost to run such applications. To reduce such costs and allow to a server to run memory intensive applications, a system may use various memory extension technologies. For example, some systems may utilize memory swap technology at an OS level. Some swap technologies place cold data on a storage device and swap-out data as needed. When the application accesses previously evicted data, the CPU generates a page fault interrupt, the application is suspended, the OS reads the evicted data back from the storage device, and finally the application is resumed.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
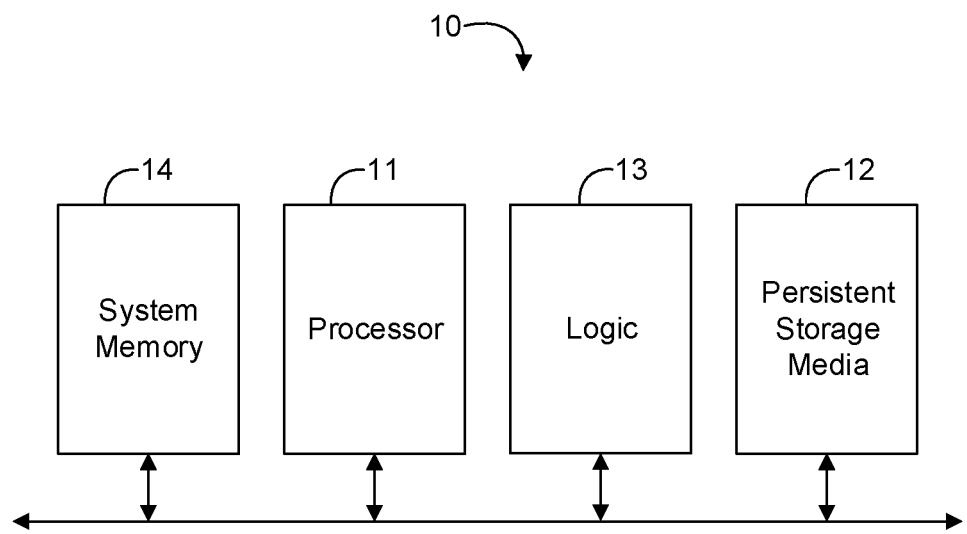
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to storage systems. More particularly, some embodiments relate to an improved storage class memory system.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

With reference to FIG. 1, an embodiment of an electronic system 10 may include a processor 11, a system memory 14 communicatively coupled to the processor 11 to store an application for execution by the processor 11, persistent storage media 12 communicatively coupled to the processor 11, and logic 13 communicatively coupled to the processor 11, the system memory 14, and the persistent storage media 12. The logic 13 may be configured to receive a first request to allocate a direct swap file associated with the application on the persistent storage media 12, and map a linear and continuous space of the persistent storage media 12 to the direct swap file associated with the application in response to the first request. The logic 13 may also be configured to receive a second request to swap data from the persistent storage media 12 to the system memory 14, and directly determine a location of the data in the direct swap file in response to the second request. For example, the logic 13 may be configured to calculate the location of the data in the direct swap file directly from a page number of the data indicated in the second request, and/or to calculate the location of the data in the direct swap file directly from a location offset of the data indicated in the second request and a pre-determined page size.

In some embodiments, the direct swap file may correspond to a direct swap virtual file, and the logic 13 may be further configured to create a logical device partition with linear and continuous logical addresses on the persistent storage media 12, and map the logical device partition to the direct swap virtual file such that an offset of memory pages for the application in the system memory 14 corresponds to a same offset of memory pages for the direct swap virtual file in the logical device partition. For example, the logic 13 may be further configured to receive a third request to handle a page fault request for the application which indicates a page number, and read a page from the direct swap virtual file at an address which corresponds to the page number indicated in the third request in response to the third request. In any of the embodiments herein, the persistent storage media 12 may comprise storage class memory (SCM).

Embodiments of each of the above processor 11, persistent storage media 12, logic 13, system memory 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), an execution unit, a general purpose controller, a special purpose controller, a memory controller, a storage controller, a micro-controller, etc. In some embodiments, the persistent storage media 12, the logic 13, and/or the system memory 14 may be located in, or co-located with, various components, including the processor 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12, the system memory 14, other persistent storage media, or other system memory may store a set of instructions which when executed by the processor 11 cause the system 10 to implement one or more components, features, or aspects of the system 10 (e.g., the logic 13, receiving the request to allocate the direct swap file on the persistent storage media 12, mapping the linear and continuous space of the persistent storage media 12 to the direct swap file, directly calculating the location of cold data, handling a page fault request with the direct swap file, etc.).

Figure 2:
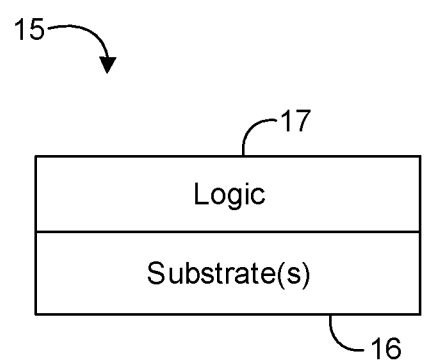
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to receive a first request to allocate a direct swap file associated with an application stored in a system memory on a persistent storage media, and map a linear and continuous space of the persistent storage media to the direct swap file associated with the application in response to the first request. The logic 17 may be further configured to receive a second request to swap data from the persistent storage media to the system memory, and directly determine a location of the data in the direct swap file in response to the second request. For example, the logic 17 may be configured to calculate the location of the data in the direct swap file directly from a page number of the data indicated in the second request, and/or to calculate the location of the data in the direct swap file directly from a location offset of the data indicated in the second request and a pre-determined page size.

In some embodiments, the direct swap file may correspond to a direct swap virtual file, and the logic 17 may be further configured to create a logical device partition with linear and continuous logical addresses on the persistent storage media, and map the logical device partition to the direct swap virtual file such that an offset of memory pages for the application in the system memory corresponds to a same offset of memory pages for the direct swap virtual file in the logical device partition. For example, the logic 17 may also be configured to receive a third request to handle a page fault request for the application which indicates a page number, and read a page from the direct swap virtual file at an address which corresponds to the page number indicated in the third request in response to the third request. In any of the embodiments herein, the persistent storage media may comprise SCM.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
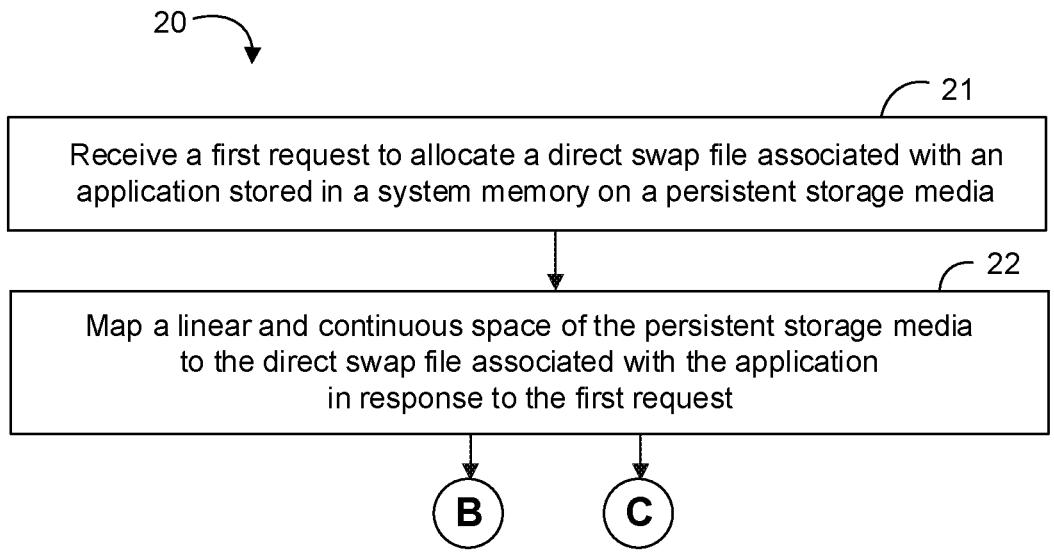
FIGS. 3A to 3C are flowcharts of an example of a method of managing memory according to an embodiment.
Figure 3B:
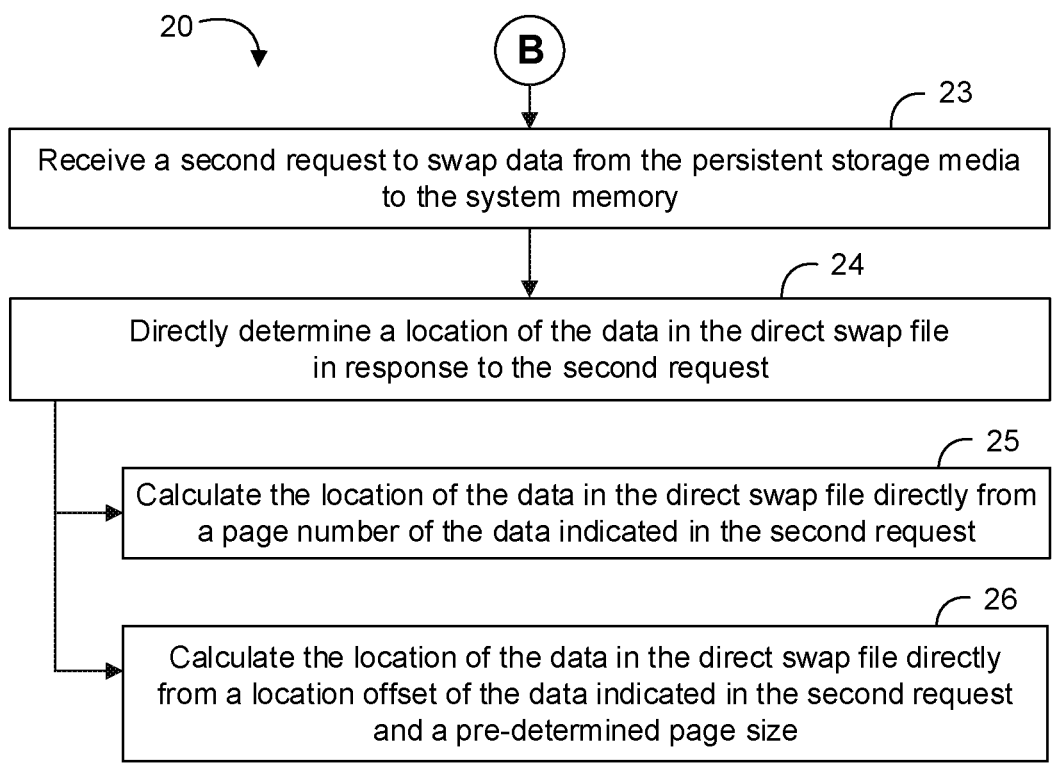
Figure 3C:
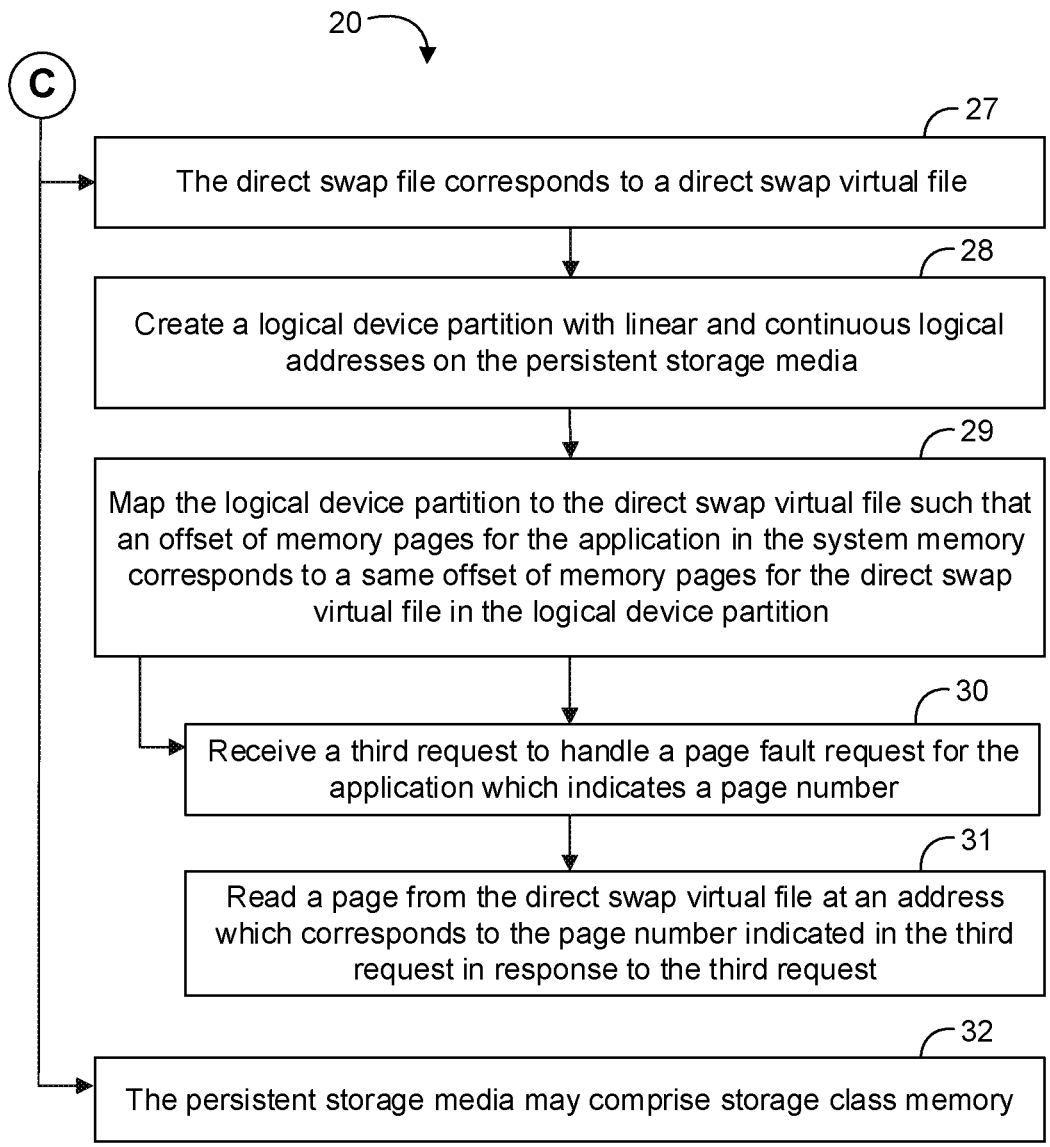

Turning now to FIGS. 3A to 3C, an embodiment of a method 20 of managing memory may include receiving a first request to allocate a direct swap file associated with an application stored in a system memory on a persistent storage media at block 21, and mapping a linear and continuous space of the persistent storage media to the direct swap file associated with the application in response to the first request at block 22. The method 20 may further include receiving a second request to swap data from the persistent storage media to the system memory at block 23, and directly determining a location of the data in the direct swap file in response to the second request at block 24. For example, the method 20 may include calculating the location of the data in the direct swap file directly from a page number of the data indicated in the second request at block 25, and/or calculating the location of the data in the direct swap file directly from a location offset of the data indicated in the second request and a pre-determined page size at block 26.

In some embodiments, the direct swap file corresponds to a direct swap virtual file at block 27, and the method 20 may further include creating a logical device partition with linear and continuous logical addresses on the persistent storage media at block 28, and mapping the logical device partition to the direct swap virtual file such that an offset of memory pages for the application in the system memory corresponds to a same offset of memory pages for the direct swap virtual file in the logical device partition at block 29. For example, the method 20 may further include receiving a third request to handle a page fault request for the application which indicates a page number at block 30, and reading a page from the direct swap virtual file at an address which corresponds to the page number indicated in the third request in response to the third request at block 31. In any of the embodiments herein, the persistent storage media may comprise SCM at block 32.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 22 to 28 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for a direct mapping memory extension using a SCM device (e.g., such as a device with INTEL 3D XPOINT memory technology). Conventional memory swap technology introduces application performance degradation because of disk access latency (e.g., where the application is suspended during OS handling of a memory page fault). SCM devices may reduce the storage device latency. However, when utilizing a device with ultra-low latency it may become more important to provide an extra efficient swap infrastructure (e.g., including software/OS/kernel components). In some conventional systems, software bottlenecks may degrade the performance of a SCM device and the application may not effectively leverage the otherwise well performing storage device. For example, some conventional memory swap technologies maintain a data structure (e.g., a B-Tree) to locate previously evicted data on the storage device. The data structure may consume space in RAM and may need to be synchronized by locks (e.g., spinlocks). The data structure look-up and data structure synchronization introduce software overhead latency.

Advantageously, some embodiments may overcome one or more of the foregoing problems with conventional memory swap technology.

Some embodiments may map memory space with a continuous space on a storage device in linear manner. When handling a memory page fault, some embodiments may advantageously directly determine exactly from where data should be read (e.g., without any extra data structure to look up the location of the evicted data). For example, some embodiments may determine the evicted data location on the storage device based only on the location offset and a pre-determined page size. For a page size of 4096 granularity, for example, to access memory at an offset of 8200, for example, an embodiment of direct swap logic may determine that the location offset corresponds to memory page 2 (e.g., 8200/4096=2). The direct swap logic may then read the data from the second page of the storage device space (e.g., the page starting at storage device address 8192). Advantageously, some embodiments of direct swap logic may provide one or more benefits as compared to conventional memory swap technology including: 1) lower latency response to a page fault (e.g., no lookup required); 2) less CPU utilization (e.g., no lookup or synchronization required); little or no memory overhead (e.g., no data structure); and/or 4) higher quality of service (QoS) for applications. Reducing the latency and software overhead also advantageously improves the effectiveness of utilizing a SCM device as a memory extension of main memory.

Figure 4:
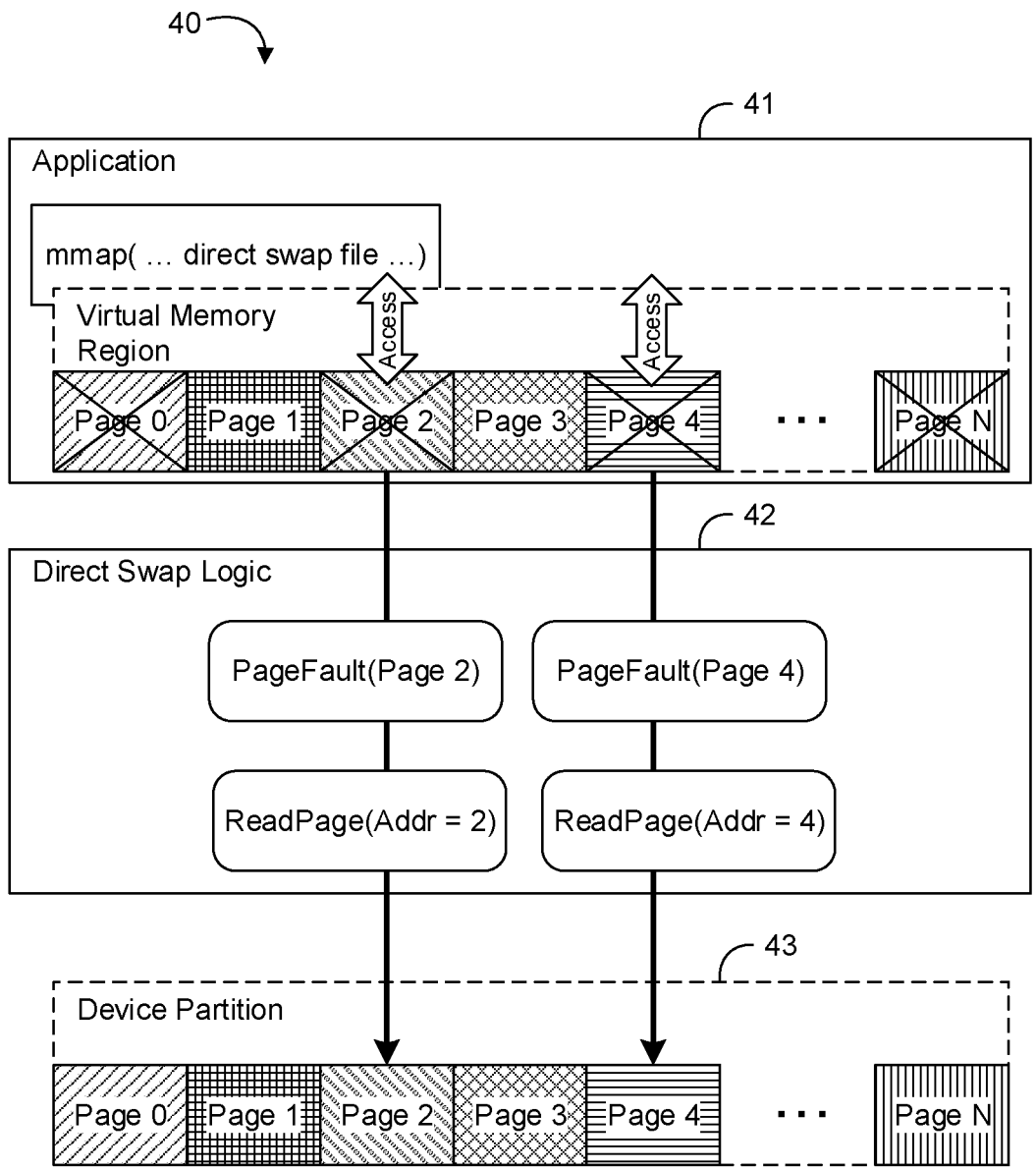
FIG. 4 is a block diagram of an example of a computing system according to an embodiment.

With reference to FIG. 4, an embodiment of a computing system 40 may include an application environment 41, a kernel environment 42, and a storage device environment 43. An application in the application environment 41 may perform a memory map operation (e.g., mmap) on a direct swap virtual file. A logical device partition may then be created with continuous linear logical addresses on the storage device. By selecting the direct swap virtual file, the application allows the kernel environment 42 to handle memory page faults interrupts by the direct swap logic as illustrated. The application is allocated the requested virtual memory region and uses the virtual memory region in a transparent way. When a page fault occurs, the direct swap logic handles the page fault with little software overhead and lower latency. Because there is a direct mapping between virtual memory region for the application and mapped locations at the storage device environment 43, the data can be located on the storage device directly because the page fault offset within the virtual memory region corresponds to a same offset on the continuous storage device space.

When a page fault occurs in a conventional system, conventional swap logic must perform an operation on a stored data structure to lookup the location of the missed data on the storage device before the conventional swap logic can read data into a physical memory page and map the into physical memory. In contrast to conventional memory swap technology, embodiments of the direct swap logic may perform the swap directly with no lookup required to locate the evicted data on the storage device. The logical address on the device partition may correspond directly to the requested page or may be readily calculated based on the offset and the page size. Those skilled in the art will appreciate that the actual physical address for the storage device may be managed by the storage device and in the storage device environment 43 an indirection table may be utilized to locate the physical data.

Figure 5:
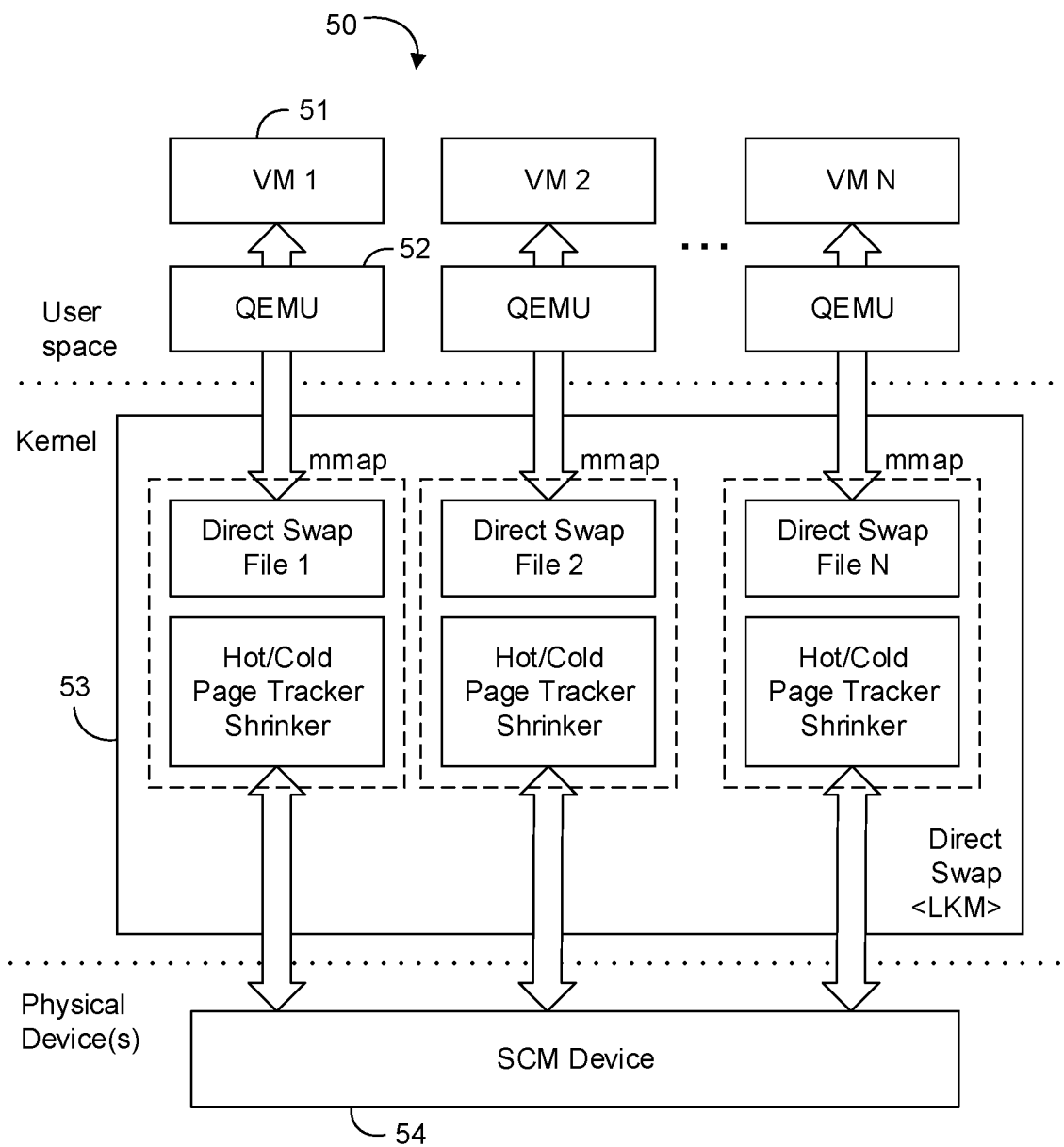
FIG. 5 is a block diagram of another example of a computing system according to an embodiment.

With reference to FIG. 5, an embodiment of a computing system 50 may include a plurality of virtual machines (VMs) 51 (e.g., VM 1 . . . VM N, where N>1) coupled from a user space through respective quick emulators (QEMUs) 52 to a kernel space. An embodiment of direct swap logic 53 may be utilized to extend virtual machine memory. For example, the direct swap logic 53 may correspond to a loadable kernel module (LKM) object file that includes code to extend the kernel. For each instance of the VMs 51, a virtual direct swap file may be created (e.g., in response to a mmap operation). Each direct swap file (e.g., Direct Swap File 1 . . . Direct Swap File N) consumes the requested amount of continuous space of a SCM device 54 and pre-allocates physical RAM memory specified as the RAM limit for the VM. The QEMU hypervisor mmaps the direct swap virtual file. The virtual memory created on top of the direct swap virtual file is presented as the guest VM memory. Advantageously, embodiments may provide separation between VMs such that the VMs do not interfere which each other. In the case when an instance of a direct swap file reaches a RAM limit, before reading a page from the SCM device, the direct swap logic 53 may unmap an already used memory page and write it to the SCM device. To decrease the number of page faults the evicted memory page is preferably a cold memory page. This information can be provided by a hot/cold page tracker module which provides candidates for eviction. The process can be implemented by any suitable hotness tracking mechanism (LRU, LFU, etc.). In some cases, the procedure of eviction can be moved to a background process (thread), sometimes referred to as a shrinker, which keeps a level of free pages. This offload may reduce latency on the page fault path. Page fault handling and other direct swap logic operations may be executed as described herein.

Figure 6:
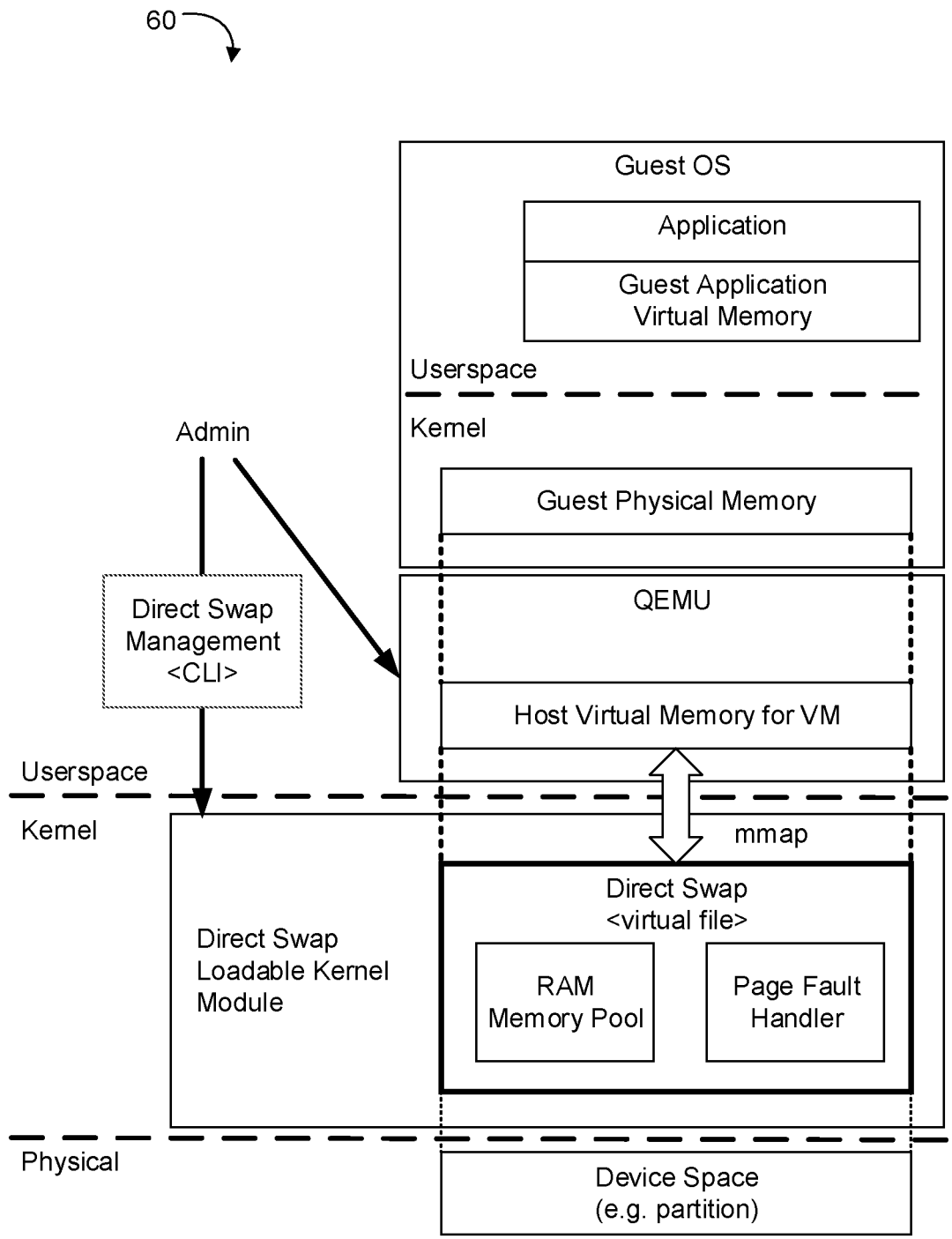
FIG. 6 is a block diagram of another example of a computing system according to an embodiment.

With reference to FIG. 6, an embodiment of a computing system 60 may include a guest OS running an application on guest virtual memory in the user space. In the kernel space, the guest OS may be allocated some guest physical memory, and also virtual memory in the form of a direct swap virtual file as described herein. An administrator may provide input to the computing system 60 through the QEMU and/or may perform direct swap management through a command line interface (CLI). Some embodiments of the system 60 may provide manageability technology to utilize direct swap logic as described herein to manage a VM use case. For example, an administrator may create the direct swap file using a management tool to define the RAM limit used by the direct swap file and/or to specify a partition on the storage device (e.g., the SCM device). The kernel module may create the virtual file. For example, the kernel module may allocate RAM memory for the virtual file equal to the defined limit, request space on the storage device, and set the file size for the virtual file equal to the partition size on the storage device. The administrator may start a QEMU with an indicator to use the direct swap file as memory for the guest OS. The QEMU may allocate memory for the guest OS by mapping the direct swap file, after which the guest OS may be up and running Page fault handling and other direct swap logic operations may then be executed as described herein.

In a comparison of embodiments of direct swap logic as described herein versus conventional memory swap technology, the direct swap logic was more efficient than the conventional memory swap technology with lower CPU utilization. In a comparison involving several VM instances, some embodiments showed lower VM application latency, lower READ average latency, lower UPDATE average latency, substantially lower READ 99$^{th}$ percentile latency, substantially lower UPDATE 99$^{th}$ percentile latency, a faster load phase, a faster run phase, and lower application latency variation (e.g., higher QoS) as compared to conventional memory swap technology.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
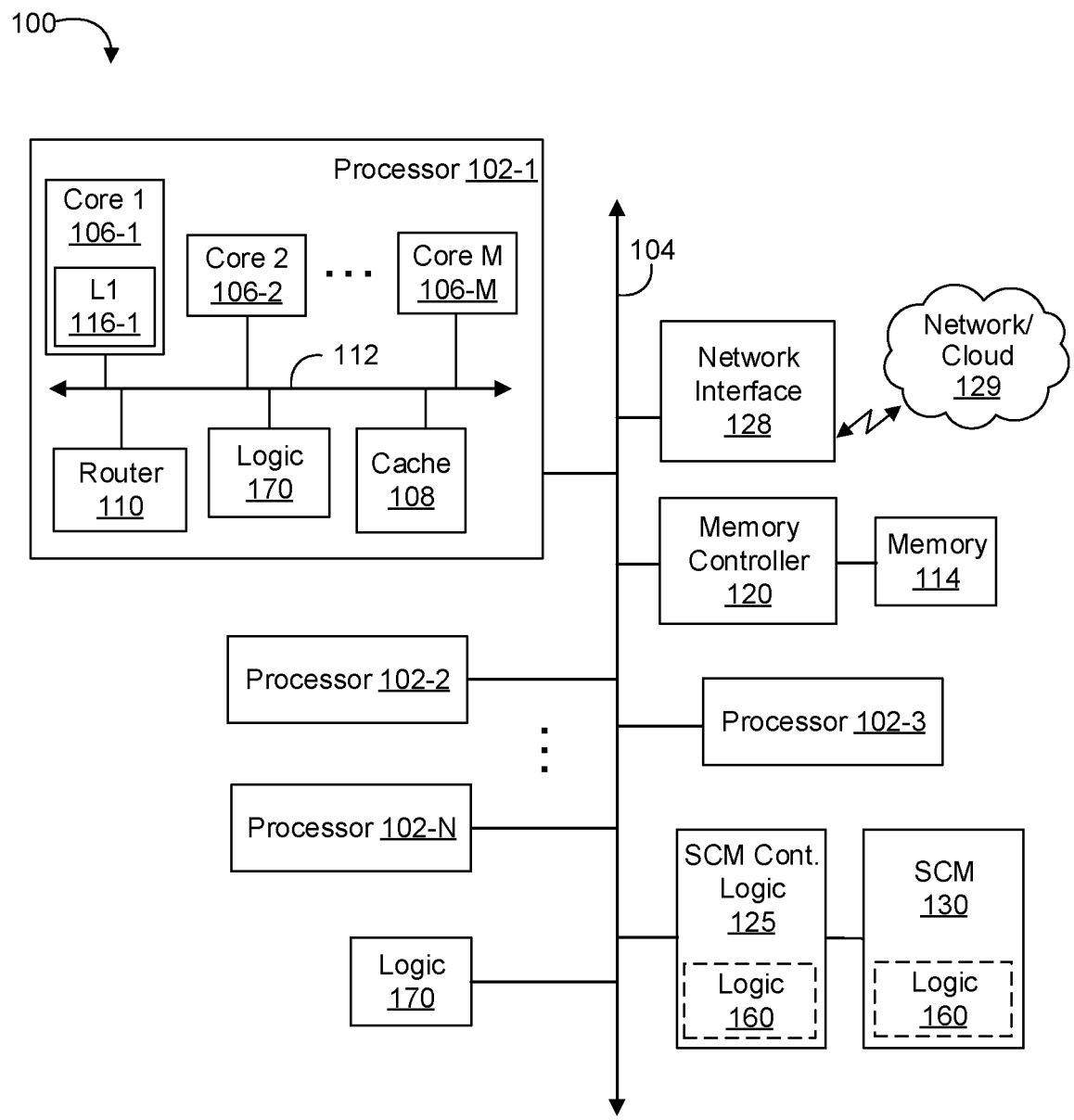
FIG. 7 is a block diagram of another example of a computing system according to an embodiment.

Turning now to FIG. 7, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 7, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 7, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a SCM device 130 coupled to the interconnect 104 via SCM controller logic 125. Hence, logic 125 may control access by various components of system 100 to the SCM device 130. Furthermore, even though logic 125 is shown to be directly coupled to the interconnection 104 in FIG. 7, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 8) or provided on a same integrated circuit (IC) device in various embodiments (e.g., on the same circuit board device as the SCM device 130 or in the same enclosure as the SCM device 130).

Furthermore, logic 125 and/or SCM device 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SCM device 130, SCM bus, SATA bus, logic 125, logic 160, logic 170, etc., to sense variations in various factors affecting power/thermal behavior of the system/platform, such as temperature, operating frequency, operating voltage, power consumption, and/or inter-core communication activity, etc.

Figure 8:
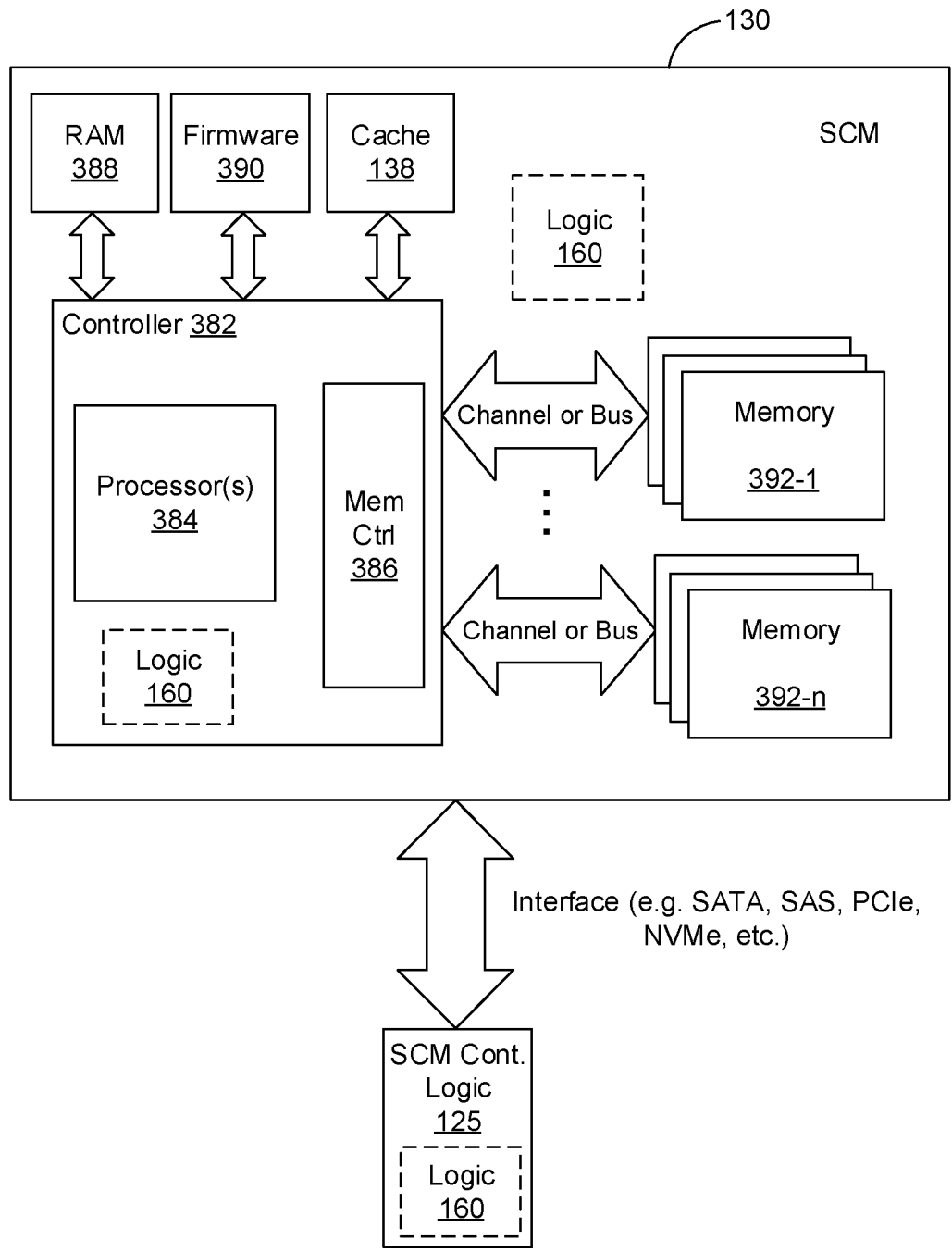
FIG. 8 is a block diagram of an example of a storage class memory (SCM) device according to an embodiment.

FIG. 8 illustrates a block diagram of various components of the SCM device 130, according to an embodiment. As illustrated in FIG. 8, logic 160 may be located in various locations such as inside the SCM device 130 or controller 382, etc., and may include similar technology as discussed in connection with FIG. 7. The SCM device 130 includes a controller 382 (which in turn includes one or more processor cores or processors 384 and memory controller logic 386), cache 138, RAM 388, firmware storage 390, and one or more memory devices 392-1 to 392-N (collectively memory 392, which may include 3D crosspoint, or other types of non-volatile memory). The memory 392 is coupled to the memory controller logic 386 via one or more memory channels or busses. Also, SCM device 130 communicates with logic 125 via an interface (such as a SATA, SAS, PCIe, NVMe, etc., interface). Processors 384 and/or controller 382 may compress/decompress data written to or read from memory devices 392-1 to 392-N.

As illustrated in FIGS. 7 and 8, the SCM device 130 may include logic 160, which may be in the same enclosure as the SCM device 130 and/or fully integrated on a printed circuit board (PCB) of the SCM device 130. The system 100 may include further logic 170 outside of the SCM device 130. One or more of the features/aspects/operations discussed with reference to FIGS. 1-6 may be performed by one or more of the components of FIGS. 7 and/or 8. Also, one or more of the features/aspects/operations of FIGS. 1-6 may be programmed into the firmware 390. Further, SCM controller logic 125 may also include logic 160. Advantageously, the logic 160 and/or logic 170 may include technology to implement one or more aspects of the system 10 (FIG. 1), the apparatus 15 (FIG. 2), the method 20 (FIGS. 3A to 3C), the system 40 (FIG. 4), the system 50 (FIG. 5), the system 60 (FIG. 6), and/or any of the features discussed herein. For example, the logic 170 may include technology to implement the host device/computer system/agent aspects of the various embodiments described herein while the logic 160 may include technology to implement the storage device aspects of the various embodiments described herein.

In particular, the logic 160/170 may be configured to receive a first request to allocate a direct swap file associated with an application (e.g., stored in the memory 114 for execution by one or more of the processors 102) on the SCM device 130, and map a linear and continuous space of the SCM device 130 to the direct swap file associated with the application in response to the first request. The logic 160/170 may also be configured to receive a second request to swap data from SCM device 130 to the memory 114, and directly determine a location of the data in the direct swap file in response to the second request. For example, the logic 160/170 may be configured to calculate the location of the data in the direct swap file directly from a page number of the data indicated in the second request, and/or to calculate the location of the data in the direct swap file directly from a location offset of the data indicated in the second request and a pre-determined page size.

In some embodiments, the direct swap file may correspond to a direct swap virtual file, and the logic 160/170 may be further configured to create a logical device partition with linear and continuous logical addresses on the SCM device 130, and map the logical device partition to the direct swap virtual file such that an offset of memory pages for the application in the memory 114 corresponds to a same offset of memory pages for the direct swap virtual file in the logical device partition. For example, the logic 160/170 may be further configured to receive a third request to handle a page fault request for the application which indicates a page number, and read a page from the direct swap virtual file at an address which corresponds to the page number indicated in the third request in response to the third request.

In other embodiments, the SCM device 130 may be replaced with any suitable storage/memory technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. In other embodiments, the SCM device 130 may include two or more types of storage media. For example, the bulk of the storage may be NAND and may further include some faster, smaller granularity accessible (e.g., byte-addressable) NVM such as INTEL 3DXP media. The SCM device 130 may alternatively, or additionally, include persistent volatile memory (e.g., battery or capacitor backed-up DRAM or SRAM). For example, the SCM device 130 may include POWER LOSS IMMINENT (PLI) tech-nology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIG. 7, features or aspects of the logic 160 and/or the logic 170 may be distributed throughout the system 100, and/or co-located/integrated with various components of the system 100.

ADDITIONAL NOTES AND EXAMPLES

Example 1 includes an electronic apparatus, comprising one or more substrates, and logic coupled to the one or more substrates, the logic to receive a first request to allocate a direct swap file associated with an application stored in a system memory on a persistent storage media, and map a linear and continuous space of the persistent storage media to the direct swap file associated with the application in response to the first request.

Example 2 includes the apparatus of claim 1, wherein the logic is further to receive a second request to swap data from the persistent storage media to the system memory, and directly determine a location of the data in the direct swap file in response to the second request.

Example 3 includes the apparatus of claim 2, wherein the logic is further to calculate the location of the data in the direct swap file directly from a page number of the data indicated in the second request.

Example 4 includes the apparatus of claim 2, wherein the logic is further to calculate the location of the data in the direct swap file directly from a location offset of the data indicated in the second request and a pre-determined page size.

Example 5 includes the apparatus of any of claims 1 to 4, wherein the direct swap file corresponds to a direct swap virtual file, and wherein the logic is further to create a logical device partition with linear and continuous logical addresses on the persistent storage media, and map the logical device partition to the direct swap virtual file such that an offset of memory pages for the application in the system memory corresponds to a same offset of memory pages for the direct swap virtual file in the logical device partition.

Example 6 includes the apparatus of claim 5, wherein the logic is further to receive a third request to handle a page fault request for the application which indicates a page number, and read a page from the direct swap virtual file at an address which corresponds to the page number indicated in the third request in response to the third request.

Example 7 includes the apparatus of any of claims 1 to 6, wherein the persistent storage media comprises storage class memory.

Example 8 includes an electronic system, comprising a processor, a system memory communicatively coupled to the processor to store an application for execution by the processor, persistent storage media communicatively coupled to the processor, and logic communicatively coupled to the processor, the system memory, and the persistent storage media, the logic to receive a first request to allocate a direct swap file associated with the application on the persistent storage media, and map a linear and continuous space of the persistent storage media to the direct swap file associated with the application in response to the first request.

Example 9 includes the system of claim 8, wherein the logic is further to receive a second request to swap data from the persistent storage media to the system memory, and directly determine a location of the data in the direct swap file in response to the second request.

Example 10 includes the system of claim 9, wherein the logic is further to calculate the location of the data in the direct swap file directly from a page number of the data indicated in the second request.

Example 11 includes the system of claim 9, wherein the logic is further to calculate the location of the data in the direct swap file directly from a location offset of the data indicated in the second request and a pre-determined page size.

Example 12 includes the system of any of claims 8 to 11, wherein the direct swap file corresponds to a direct swap virtual file, and wherein the logic is further to create a logical device partition with linear and continuous logical addresses on the persistent storage media, and map the logical device partition to the direct swap virtual file such that an offset of memory pages for the application in the system memory corresponds to a same offset of memory pages for the direct swap virtual file in the logical device partition.

Example 13 includes the system of claim 12, wherein the logic is further to receive a third request to handle a page fault request for the application which indicates a page number, and read a page from the direct swap virtual file at an address which corresponds to the page number indicated in the third request in response to the third request.

Example 14 includes the system of any of claims 8 to 13, wherein the persistent storage media comprises storage class memory.

Example 15 includes a method of managing memory, comprising receiving a first request to allocate a direct swap file associated with an application stored in a system memory on a persistent storage media, and mapping a linear and continuous space of the persistent storage media to the direct swap file associated with the application in response to the first request.

Example 16 includes the method of claim 15, further comprising receiving a second request to swap data from the persistent storage media to the system memory, and directly determining a location of the data in the direct swap file in response to the second request.

Example 17 includes the method of claim 16, further comprising calculating the location of the data in the direct swap file directly from a page number of the data indicated in the second request.

Example 18 includes the method of claim 16, further comprising calculating the location of the data in the direct swap file directly from a location offset of the data indicated in the second request and a pre-determined page size.

Example 19 includes the method of any of claims 15 to 18, wherein the direct swap file corresponds to a direct swap virtual file, the method further comprising creating a logical device partition with linear and continuous logical addresses on the persistent storage media, and mapping the logical device partition to the direct swap virtual file such that an offset of memory pages for the application in the system memory corresponds to a same offset of memory pages for the direct swap virtual file in the logical device partition.

Example 20 includes the method of claim 19, further comprising receiving a third request to handle a page fault request for the application which indicates a page number, and reading a page from the direct swap virtual file at an address which corresponds to the page number indicated in the third request in response to the third request.

Example 21 includes the method of any of claims 15 to 20, wherein the persistent storage media comprises storage class memory.

Example 22 includes at least one non-transitory one machine readable medium comprising a plurality of instructions that, in response to being executed on a computing device, cause the computing device to receive a first request to allocate a direct swap file associated with an application stored in a system memory on a persistent storage media, and map a linear and continuous space of the persistent storage media to the direct swap file associated with the application in response to the first request.

Example 23 includes the at least one non-transitory one machine readable medium of claim 22, comprising a plurality of further instructions that, in response to being executed on the computing device, cause the computing device to receive a second request to swap data from the persistent storage media to the system memory, and directly determine a location of the data in the direct swap file in response to the second request.

Example 24 includes the at least one non-transitory one machine readable medium of claim 23, comprising a plurality of further instructions that, in response to being executed on the computing device, cause the computing device to calculate the location of the data in the direct swap file directly from a page number of the data indicated in the second request.

Example 25 includes the at least one non-transitory one machine readable medium of claim 23, comprising a plurality of further instructions that, in response to being executed on the computing device, cause the computing device to calculate the location of the data in the direct swap file directly from a location offset of the data indicated in the second request and a pre-determined page size.

Example 26 includes the at least one non-transitory one machine readable medium of any of claims 22 to 25, wherein the direct swap file corresponds to a direct swap virtual file, comprising a plurality of further instructions that, in response to being executed on the computing device, cause the computing device to create a logical device partition with linear and continuous logical addresses on the persistent storage media, and map the logical device partition to the direct swap virtual file such that an offset of memory pages for the application in the system memory corresponds to a same offset of memory pages for the direct swap virtual file in the logical device partition.

Example 27 includes the at least one non-transitory one machine readable medium of claim 26, comprising a plurality of further instructions that, in response to being executed on the computing device, cause the computing device to receive a third request to handle a page fault request for the application which indicates a page number, and read a page from the direct swap virtual file at an address which corresponds to the page number indicated in the third request in response to the third request.

Example 28 includes the at least one non-transitory one machine readable medium of any of claims 22 to 27, wherein the persistent storage media comprises storage class memory.

Example 29 includes a memory manage apparatus, comprising means for receiving a first request to allocate a direct swap file associated with an application stored in a system memory on a persistent storage media, and means for mapping a linear and continuous space of the persistent storage media to the direct swap file associated with the application in response to the first request.

Example 30 includes the apparatus of claim 295, further comprising means for receiving a second request to swap data from the persistent storage media to the system memory, and means for directly determining a location of the data in the direct swap file in response to the second request.

Example 31 includes the apparatus of claim 30, further comprising means for calculating the location of the data in the direct swap file directly from a page number of the data indicated in the second request.

Example 32 includes the apparatus of claim 30, further comprising means for calculating the location of the data in the direct swap file directly from a location offset of the data indicated in the second request and a pre-determined page size.

Example 33 includes the apparatus of any of claims 29 to 32, wherein the direct swap file corresponds to a direct swap virtual file, the method further comprising means for creating a logical device partition with linear and continuous logical addresses on the persistent storage media, and means for mapping the logical device partition to the direct swap virtual file such that an offset of memory pages for the application in the system memory corresponds to a same offset of memory pages for the direct swap virtual file in the logical device partition.

Example 34 includes the apparatus of claim 33, further comprising means for receiving a third request to handle a page fault request for the application which indicates a page number, and means for reading a page from the direct swap virtual file at an address which corresponds to the page number indicated in the third request in response to the third request.

Example 35 includes the apparatus of any of claims 29 to 34, wherein the persistent storage media comprises storage class memory.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
  one or more substrates; and
  logic coupled to the one or more substrates, the logic to:
    receive a first request to allocate a direct swap file associated with an application stored in a system memory on a persistent storage media, and
    map a linear and continuous space of the persistent storage media to the direct swap file associated with the application in response to the first request.

2. The apparatus of claim 1, wherein the logic is further to:
  receive a second request to swap data from the persistent storage media to the system memory; and
  directly determine a location of the data in the direct swap file in response to the second request.

3. The apparatus of claim 2, wherein the logic is further to:
  calculate the location of the data in the direct swap file directly from a page number of the data indicated in the second request.

4. The apparatus of claim 2, wherein the logic is further to:
  calculate the location of the data in the direct swap file directly from a location offset of the data indicated in the second request and a pre-determined page size.

5. The apparatus of claim 1, wherein the direct swap file corresponds to a direct swap virtual file, and wherein the logic is further to:
  create a logical device partition with linear and continuous logical addresses on the persistent storage media; and
  map the logical device partition to the direct swap virtual file such that an offset of memory pages for the application in the system memory corresponds to a same offset of memory pages for the direct swap virtual file in the logical device partition.

6. The apparatus of claim 5, wherein the logic is further to:
  receive a third request to handle a page fault request for the application which indicates a page number; and
  read a page from the direct swap virtual file at an address which corresponds to the page number indicated in the third request in response to the third request.

7. The apparatus of claim 1, wherein the persistent storage media comprises storage class memory.

8. An electronic system, comprising:
  a processor;
  a system memory communicatively coupled to the processor to store an application for execution by the processor;
  persistent storage media communicatively coupled to the processor; and
  logic communicatively coupled to the processor, the system memory, and the persistent storage media, the logic to:
    receive a first request to allocate a direct swap file associated with the application on the persistent storage media, and
    map a linear and continuous space of the persistent storage media to the direct swap file associated with the application in response to the first request.

9. The system of claim 8, wherein the logic is further to:
  receive a second request to swap data from the persistent storage media to the system memory; and
  directly determine a location of the data in the direct swap file in response to the second request.

10. The system of claim 9, wherein the logic is further to:
  calculate the location of the data in the direct swap file directly from a page number of the data indicated in the second request.

11. The system of claim 9, wherein the logic is further to:
  calculate the location of the data in the direct swap file directly from a location offset of the data indicated in the second request and a pre-determined page size.

12. The system of claim 8, wherein the direct swap file corresponds to a direct swap virtual file, and wherein the logic is further to:
  create a logical device partition with linear and continuous logical addresses on the persistent storage media; and
  map the logical device partition to the direct swap virtual file such that an offset of memory pages for the application in the system memory corresponds to a same offset of memory pages for the direct swap virtual file in the logical device partition.

13. The system of claim 12, wherein the logic is further to:
  receive a third request to handle a page fault request for the application which indicates a page number; and
  read a page from the direct swap virtual file at an address which corresponds to the page number indicated in the third request in response to the third request.

14. The system of claim 8, wherein the persistent storage media comprises storage class memory.

15. A method of managing memory, comprising:
  receiving a first request to allocate a direct swap file associated with an application stored in a system memory on a persistent storage media, and
  mapping a linear and continuous space of the persistent storage media to the direct swap file associated with the application in response to the first request.

16. The method of claim 15, further comprising:
  receiving a second request to swap data from the persistent storage media to the system memory; and
  directly determining a location of the data in the direct swap file in response to the second request.

17. The method of claim 16, further comprising:
  calculating the location of the data in the direct swap file directly from a page number of the data indicated in the second request.

18. The method of claim 16, further comprising:
calculating the location of the data in the direct swap file directly from a location offset of the data indicated in the second request and a pre-determined page size.

19. The method of claim 15, wherein the direct swap file corresponds to a direct swap virtual file, the method further comprising:
creating a logical device partition with linear and continuous logical addresses on the persistent storage media; and
mapping the logical device partition to the direct swap virtual file such that an offset of memory pages for the application in the system memory corresponds to a same offset of memory pages for the direct swap virtual file in the logical device partition.

20. The method of claim 19, further comprising:
receiving a third request to handle a page fault request for the application which indicates a page number; and
reading a page from the direct swap virtual file at an address which corresponds to the page number indicated in the third request in response to the third request.

* * * * *